Patented Mar. 8, 1927.

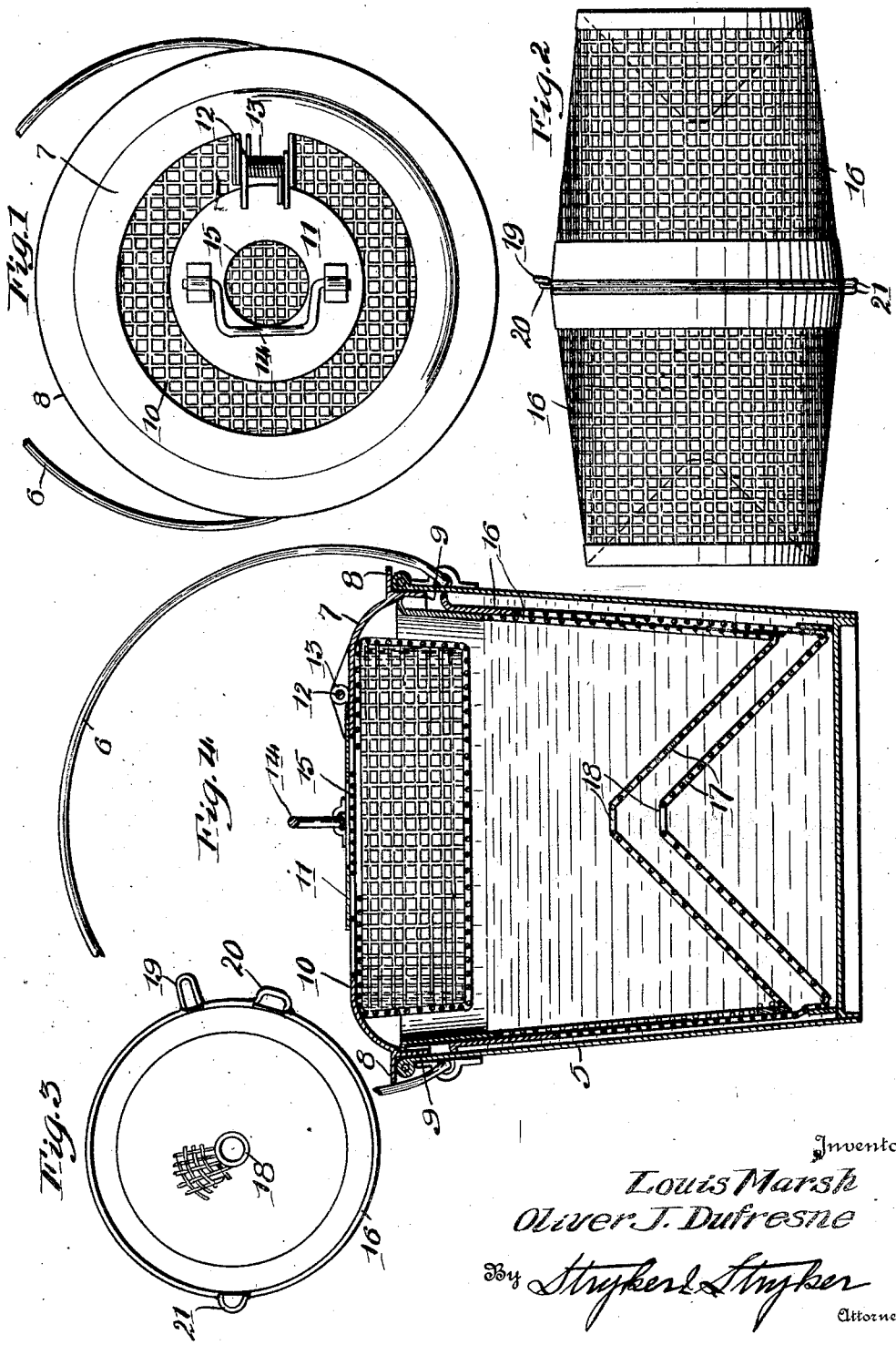

1,620,617

UNITED STATES PATENT OFFICE.

LOUIS MARSH AND OLIVER J. DUFRESNE, OF ST. PAUL, MINNESOTA; SAID LOUIS MARSH ASSIGNOR TO SAID OLIVER J. DUFRESNE.

FISHERMAN'S BAIT TRAP AND CARRIER.

Application filed April 25, 1925. Serial No. 25,817.

It is our object to provide an improved fisherman's device, adapted to facilitate handling and carrying live bait, such as minnows and frogs, the invention including a compact container, a part of which, is adapted for use as a trap for minnows. This invention also includes certain other novel features of construction, which will be more fully pointed out in the following specification and claim.

In the accompanying drawings, we have illustrated the best form of our device at present known to us. Referring to the drawings, Figure 1 is a plan view of our invention; Fig. 2 is a side elevation of the minnow trap, separate from the carrier; Fig. 3 is a plan view of an end of one of the trap units and Fig. 4 is a central, vertical section through the bait carrier and trap.

As illustrated, we provide a container 5 for water, adapted to be carried by a bail 6 of common form. The container 5 is provided with a cover 7, having an annular flange 8, adapted to rest upon the upper edge of the container 5 and a second flange 9, adapted to fit within the top of said container. Rigidly secured to the inner surface of the cover 7 is a foraminous basket 10 for frogs. This basket is provided with a door 11 mounted on a hinge 12 and arranged to be maintained in closed position by a coiled spring 13. The door 11 has a handle 14 and is formed with a central opening covered by suitable wire screening 15.

Fitting within the container 5 is a minnow trap 16 composed of two identical sections adapted to telescope one within the other, as shown in Figure 4. One end 17 of each of the trap sections is conical in shape, being arranged to project inward. Suitable openings 18 in the conical ends 17 are arranged to admit minnows to the trap. The opposite ends are open and arranged to register one with the other. Said ends are provided, as shown in Figure 3, with a series of loops 19, 20 and 21, which are formed by bending outward a wire which encircles the end of each section. The trap 16 and basket 10 are made of suitable small mesh wire or other foraminous material.

To assemble the trap, as shown in Figure 2, it is only necessary to insert the loops 19 of each of the trap sections into the loop 20 on the companion trap section and to secure the loops 21 together by means of a suitable wire or cord. To set the trap 16, the sections are removed from the container 5, and after inserting suitable bait, are assembled, as shown in Figure 2. The trap is then immersed in a lake or other body of water and allowed to remain over night for catching minnows, which enter the trap through the openings 18 in the conical ends 17.

When the minnows have been thus caught, they are transferred to the container 5, which is partially filled with water, as indicated in Figure 4. The trap sections may be readily separated by merely disconnecting the loops 21, and after tilting one section relative to the other, withdrawing the loops 19 from the loops 20. With the trap sections separated, and with the minnows in one section, the latter may be telescoped into the other, and both sections placed within the container 5, as shown in Figure 4. The cover 7 may now be placed upon the container 5, with the flanges 9 extending within the upper end of said container, and the flanges 8 resting upon the upper margin thereof. Frogs or other live bait may now be placed in the basket 10 in the top of the container 5 by inserting such bait through the door 11. As will now be readily understood, frogs and minnows may be readily carried in the compact container 5, and such bait is kept alive in and above the water in the container until needed.

Having described our invention what we claim as new and desire to protect by Letters Patent is:

The combination with a container for water, of a minnow trap, formed in sections adapted to be telescoped one within the other within said container, and a cover for said container composed of foraminous material throughout the greater portion of its area, a foraminous basket rigidly attached thereto and positioned above the water in said container, said cover closing the top of said basket and said cover being provided with a spring-actuated door arranged to allow access to the interior of said basket.

In testimony whereof, we have hereunto signed our names to this specification.

OLIVER J. DUFRESNE.
LOUIS MARSH.